July 8, 1941.  C. A. CAMPBELL  2,248,850
VALVE FOR AIR BRAKES AND THE LIKE
Filed June 26, 1940
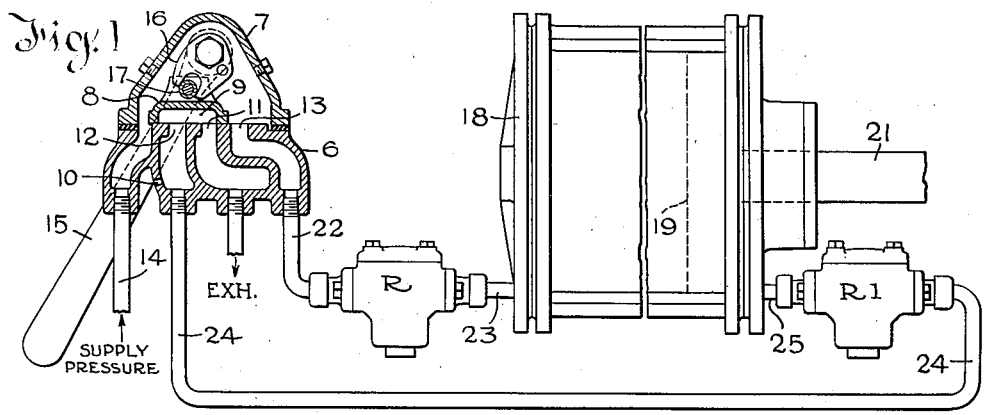
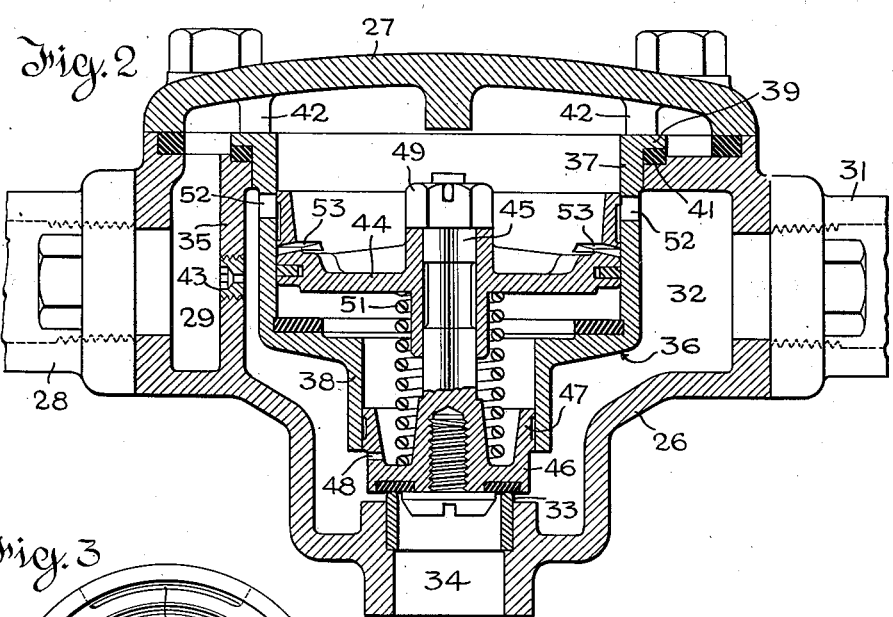
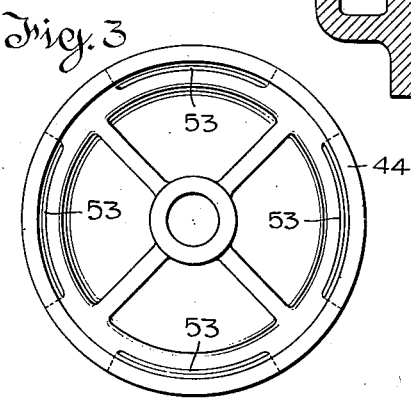
Inventor
Charles A. Campbell
By
Dodge and Sons
Attorneys Patented July 8, 1941

2,248,850

UNITED STATES PATENT OFFICE 2,248,850

VALVE FOR AIR BRAKES AND THE LIKE

Charles A. Campbell, Watertown, N. Y., assignor to The New York Air Brake Company, a corporation of New Jersey Application June 26, 1940, Serial No. 342,585

6 Claims. (Cl. 303—69)

This invention relates to release valves and particularly to valves of the type used in the air brake art where the controlling valve is located at a point remote from the brake cylinder, the release valve being located closely adjacent the brake cylinder and functioning in response to exhaust flow from the brake cylinder to open a local exhaust of large capacity, thus expediting release of the brake and avoiding delay incident to flow through a long and restricted connection.

The present valve is available for air brake service but was developed to meet a particular problem arising in connection with the double-acting motor for raising and lowering water scoops on high speed steam locomotives. Very rapid exhaust action is essential for this service and conventional quick release valves have recently been successfully applied to both ends of the double-acting cylinder. However, accidents were traced to freezing up of the exhaust port of the quick release valve. Under these circumstances the duration of release was many times that which would have been secured had the release valves been completely absent.

The purpose of the present invention is so to improve quick release valves that if the quick release port is obstructed or plugged, a release comparable in speed to that secured without release valves, will be had.

How effective the invention is will be appreciated from the following figures. Tests show that in water scoop service a one inch quick release valve constructed according to the present invention will normally release in 0.38 second. With the release port completely closed, the time of release is 1.37 seconds. With the same size and length of pipe and with the quick release valve completely omitted, the time of release is 1.19 seconds. On the other hand, using the same size and length of pipe with the release valve of the prior art, i. e. the same quick release valve lacking the improvements herein described and claimed, the time of release when the release port is plugged is 12.88 seconds. Thus the invention, under the abnormal conditions stated, reduces the time of release from 12.88 seconds to 1.37 seconds, the net penalty for the presence of an inactive release valve therefore being only the difference between 1.19 seconds and 1.37 seconds, which is tolerable.

While the invention is important only under the abnormal conditions stated, the risk of their occurrence, particularly in winter, is sufficiently serious and the consequences of slow action are so disastrous that the slight extra complication is more than justified.

The invention will now described as embodied for use in conjunction with a double-acting water scoop cylinder.

In the drawing:

Fig. 1 is a diagrammatic view of such a cylinder in elevation, together with a controlling valve shown in section, there being a quick release valve in each of the connections from the controlling valve to the opposite ends of the cylinder.

Fig. 2 is a vertical axial section through the quick release valve.

Fig. 3 is a plan view of the piston of the quick release valve showing the special porting by means of which the purposes of the invention are accomplished.

In Fig. 1 the main control valve has a body 6 with a cap 7. On the upper face of the body 6 is a seat for a D slide valve 8 having in its seated face a cavity 9. The seat has three ports; a middle exhaust port 11, a cylinder port 12 intended to be connected with the rod end of the control cylinder, and a cylinder port 13 intended to be connected with the head end of the control cylinder. Supply connection 14 delivers air under pressure to the space within the cap 7 above the D slide valve 8. The valve is shifted by handle 15 which operates the fork 16 within the cap, the fork straddling a roller 17 on the back of the slide valve. In the position shown, the port 13 is under supply pressure and the port 12 is connected to exhaust. If the handle 15 be shifted to the right, the valve 8 moves to the right with the result that the port 12 is connected to supply and the port 13 is connected to exhaust. This is the position in which the scoop is lowered and a warning port 10 indicates that fact by giving an audible signal.

The cylinder to be controlled is generally indicated at 18 and has a piston 19 indicated in dotted lines at the right hand end of the cylinder. The piston rod appears at 21. The scoop and its actuating connections are not shown.

From the port 13 a pipe 22 leads through the quick release valve generally indicated by the legend R, and thence through a short pipe connection 23 to the head end working-space of the cylinder 18. Similarly the port 12 is connected by a pipe 24 to a second release valve R1, and thence by a short pipe 25 to the rod end working-space of the cylinder 18. The pipes 23 and 25 are preferably made as short as reasonably practicable, the purpose being to minimize the lengths of the flow paths from each working-space to the corresponding quick release valve.

The valves R and R1 are identical and are illustrated in detail in Figs. 2 and 3, to which reference may now be made.

The body 26 of the release valve has a removable cap 27 through which the valve, the valve piston and the bushing which forms the cylinder and valve guide, are removable. There is a supply connection 28 leading to a supply chamber 29 and to this supply connection 28 the pipe 22 or 24 from the controlling valve leads. There is also a discharge connection 31 leading from the discharge chamber 32 to the pipe 23 or 25, as the case may be. The chamber 29 is called the supply chamber because the entire supply flow occurs through it, whereas such exhaust flow as takes place through it is slight. The chamber 32 is called the exhaust chamber because it is in free communication with the valve seat 33 which controls the quick release or vent port 34 leading directly to atmosphere.

The chambers 29 and 32 are separated from each other partly by a partition 35 and partly by a combined cylinder and valve guide bushing generally indicated by the numeral 36. This bushing has a cylinder portion 37 and below it an axially aligned cylindrical valve guide portion 38. The bushing 36 has a flange 39 at its upper end which seats on the gasket 41 and is pressed thereagainst by bosses 42 formed on the cap 27. Thus the cap 27 holds the bushing 36 in place and maintains an airtight seal between the bushing and portions of the body 26 and partition 35.

A flow restricting choke 43 is screwed into a tapped hole in the partition 35 and offers a limited flow connection directly between the chambers 29 and 32. Flow between these two chambers through the valve guide and cylinder is normally prevented by a flanged piston 44 which works in the cylinder portion 37 of the bushing. The piston 44 is mounted for limited sliding motion on the stem 45 of a poppet valve 46 which normally seats on the valve seat 33 to close the vent port 34.

The valve 46 has an upward extending flange 47 which is of greater diameter than the valve and is guided in the valve guiding portion 38 of the bushing 36. Below the flange 47 is a port 48 which is constantly open, as will be apparent from an inspection of Fig. 2. Upward motion of the piston 44 relatively to the valve stem 45 is limited by a nut 49 screwed on the upper end of the valve stem, and upward motion of the stem is limited by collision with a boss on the cap.

Formed in cylinder 37 are a circumferential series of ports 52. When the valve 46 is on its seat and the piston 44 is at its uppermost limit of motion relatively to the valve, the flange on the piston 44 blanks the ports 52. However, when pressure fluid arrives through the chamber 29 and reacts downward on the piston 44, the piston is depressed against the resistance of spring 51 and exposes the ports 52 so that air flows directly to the chamber 32 and consequently to the corresponding working space of the cylinder 18.

A stressing of the spring 51 as an incident to depression of the piston assures closure of the valve 46. After the flow ceases, the spring 51 will raise the piston 44 to its limit but the valve 46 will be held closed because the pressures above and below the piston 44 are equalized and because the pressure in chamber 32 is reacting through port 48 on the back of valve 46, which at that time is exposed on its lower face to atmospheric pressure. If pressure in the chamber 29 be then lowered, choke 43 will permit limited backflow, with the result that the piston 44 is subjected to a controlled differential pressure, causing it to move upward.

An important novel feature of the present invention is the provision of the slot ports 53 in the flange of piston 44 so located that upon an abnormal rise of the piston 44 the ports 53 will open into the ports 52. From an inspection of Fig. 3 it will be apparent that the ports 53 subtend the major portion of the circumference of the piston 44, and hence have substantial flow capacity.

If the quick release port 34 is clear, as it normally is, the sequence of operation will be as follows. When pressure in the chamber 29 drops, the piston 44 will move upward at a rate limited by the equalizing flow capacity of choke 43. Immediate opening of valve 46 will reduce the pressure in chamber 32 and consequently reduce the lifting tendency on piston 44. Thus the ports 53 will open slightly, if at all, into the ports 52.

On the other hand, should the quick release port 34 be seriously clogged, or completely closed, the pressure in the chamber 32 will not fall, or will not fall so rapidly, upon the rise of the piston 44. Hence the piston 44 will move full stroke, or nearly so, and the ports 53 will open fully into the ports 52. The aggregate capacity of these intercommunicating ports approximates the capacity of the pipes 22 or 24 so that under the conditions last stated the release action would be as fast as it would be were the quick release valves R, R1 wholly absent.

The provision of a lost motion connection between the piston and the valve, with the reaction spring so arranged that the piston acts as a valve to control flow toward the cylinder, is a known expedient in the art. The major novel feature in the present invention is the provision of the ports 53 to afford valve action on reverse flow to meet the contingencies which arise when the quick release port is closed. However, to use such ports successfully, it is important to have the restricted bypass 43 or its equivalent, and important to coordinate the capacity of that bypass with other characteristics of the valve so that the ports 53 will not open or at any rate will not open widely in the normal quick release action of the quick release valve. To explain, if the ports 53 open suddenly, there is a tendency to flood the chamber 29, with the result that an immediate closing tendency would develop. This would lead to hunting and faulty action. It is difficult so to form ports 53 that their initial opening is slight. The constantly open choke 43 can be so proportioned as just to prevent ports 53 from opening at all provided port 34 is clear and the valve operates normally. Hence the port 43 is a very desirable but not strictly indispensable feature.

Various modifications can be made within the scope of the invention, the important thing being a back flow valve action which will occur if the quick release is closed and will not occur in any material degree otherwise.

I claim:

1. A quick release device for interposition between a supply-and-exhaust valve and a space to and from which it supplies and exhausts pressure fluid, said device comprising in combination a body having a supply chamber arranged for connection with such valve, an exhaust chamber arranged for connection with such space, and a large capacity exhaust port leading from said exhaust chamber; a movable abutment separating, and subject on opposite sides to fluid pressures in, said chambers; a vent valve controlling said exhaust port and connected to be actuated by said abutment; means forming a loaded back pressure valve for permitting one-way flow from the supply to the exhaust chamber; and valve means associated with said abutment and serving to open a passage of substantial flow capacity from the exhaust chamber to supply chamber when and only when the abutment moves into an extreme vent valve-opening range.

2. A quick release device for interposition between a supply-and-exhaust valve and a space to and from which it supplies and exhausts pressure fluid, said device comprising in combination a body having a supply chamber arranged for connection with such valve, an exhaust chamber arranged for connection with such space, and a large capacity exhaust port leading from said exhaust chamber; a movable abutment separating, and subject on opposite sides to fluid pressures on, said chambers; a vent valve controlling said exhaust port and connected to be actuated by said abutment; means forming a loaded back pressure valve for permitting one-way flow from the supply to the exhaust chamber; valve means associated with said abutment and serving to open a passage of substantial flow capacity from the exhaust chamber to supply chamber when and only when the abutment moves into an extreme vent valve-opening range; and means providing a constantly open restricted communication between said chambers.

3. A quick release device for interposition between a supply-and-exhaust valve and a space to and from which it supplies and exhausts pressure fluid, said device comprising in combination a body having a supply chamber arranged for connection with such valve, an exhaust chamber arranged for connection with such space, and a large capacity exhaust port leading from said exhaust chamber; a movable abutment separating and subject on opposite sides to fluid pressures in said chambers; a valve controlling said exhaust port; a spring-loaded lost motion connection between said abutment and valve whereby the abutment reacts yieldingly on the valve in a closing direction and positively in an opening direction; and valve means associated with said abutment and serving to open communication between said chambers both when the abutment overpowers said spring when the valve is closed, and when the abutment moves in an extreme valve opening range, and close such communication at other times.

4. A quick release device for interposition between a supply-and-exhaust valve and a space to and from which it supplies and exhausts pressure fluid, said device comprising in combination a body having a supply chamber arranged for connection with such valve, an exhaust chamber arranged for connection with such space and a large capacity exhaust port leading from said exhaust chamber; a movable abutment separating and subject on opposite sides to fluid pressures in said chambers; a valve controlling said exhaust port; a spring-loaded lost motion connection between said abutment and valve whereby the abutment reacts yieldingly on the valve in a closing direction and positively in an opening direction; valve means associated with said abutment and serving to open communication between said chambers both when the abutment overpowers said spring when the valve is closed, and when the abutment moves in an extreme valve opening range, and close such communication at other times; and means providing a constantly open restricted communication between said chambers.

5. A quick release device for interposition between a supply-and-exhaust valve and a space to and from which it supplies and exhausts pressure fluid, said device comprising in combination, a body having a supply chamber arranged for connection with such valve, an exhaust chamber arranged for connection with such space, and a large capacity exhaust port leading from said exhaust chamber; a piston and cylinder unit removably mounted in said body and separating said chambers, the piston thereof being subject on opposite faces to the pressures in said chambers and the cylinder being externally exposed to pressure in the exhaust chamber; a poppet vent valve normally closing said exhaust port and having a stem in sliding engagement with said piston; a spring and stop reaction device between the piston and vent valve whereby the piston may urge the valve yieldingly closed and may move it positively open according as pressure in the supply or exhaust chamber predominates; valve means comprising ports in the cylinder so arranged as to be opened by a part associated with the piston in opposite extreme positions of the piston, for connecting chambers both when the piston overpowers said spring and when the piston reaches an abnormal vent valve opening range and disconnecting said chambers in intermediate positions; and means affording a restricted communication between said chambers whereby the normal vent valve opening motion of the piston is limited by the resulting limitation of pressure differential.

6. A quick release device for interposition between a supply-and-exhaust valve and a space to and from which it supplies and exhausts pressure fluid, said device comprising, in combination, a body having a supply chamber arranged for connection with such valve, an exhaust chamber arranged for connection with such space and a relatively large capacity exhaust port leading from said exhaust chamber; a movable abutment interposed between said chambers and subject on opposite sides to fluid pressures existing in said chambers; a vent valve controlling said exhaust port, operatively connected with said abutment and arranged to be shifted thereby to close said port when supply chamber pressure predominates and open said port when exhaust chamber pressure predominates; one-way flow valve means effective when the vent valve is closed and supply chamber pressure predominates to permit flow from the supply to the exhaust chamber; and valve means associated with said abutment and serving to open a passage of substantial flow capacity from the exhaust chamber to the supply chamber when and only when the abutment moves into an extreme vent valve opening range.

CHARLES A. CAMPBELL.